POPCORN POPPER HAVING AUTOMATIC BUTTERING MEANS

Original Filed April 23, 1971

INVENTOR.
Joseph E. Cole.

BY Dallett Hoopes
ATTORNEY.

United States Patent Office

Re. 27,920
Reissued Feb. 12, 1974

27,920
POPCORN POPPER HAVING AUTOMATIC BUTTERING MEANS

Joseph E. Cole, Wellesley, Mass., assignor to Scovill Manufacturing Company, Waterbury, Conn.

Original No. 3,722,399, dated Mar. 27, 1973, Ser. No. 136,892, Apr. 23, 1971. Application for reissue Sept. 11, 1973, Ser. No. 394,281
Int. Cl. A23l *11/18*
U.S. Cl. 99—323.8 4 Claims

Matter enclosed in heavy brackets [ ] appears in the original patent but forms no part of this reissue specification; matter printed in italics indicates the additions made by reissue.

ABSTRACT OF THE DISCLOSURE

Popcorn popper has cover with butter-receiving support. Temperature at end of popping melts butter which passes through apertures in support to drip over popped corn.

This invention relates to a popcorn popper. More specifically, this invention relates to a popcorn popper hvaing automatic popcorn buttering means.

In poppers of the prior art, mechanical means have been provided to dispense butter or other seasoning onto the finished popcorn. Usually, these means have been manually actuated or mechanically actuated through some timing device.

The present invention has for an object an extremely simple structure which provides automatic buttering of the finished popcorn at the appropriate time. It is inexpensive and simple to manufacture and foolproof in operation.

Other objects and features of the invention will be apparent to those skilled in the art from a reading of the following specification including the drawings wherein.

Briefly, the invention is a popcorn popper comprising a popping receptacle having heating means and a cover. The cover has a butter-receiving support in heat exchange relation with the receptacle. The floor of the support has apertures which will not permit passage of solid butter pats but will permit the passage of melted butter.

Figure 1:
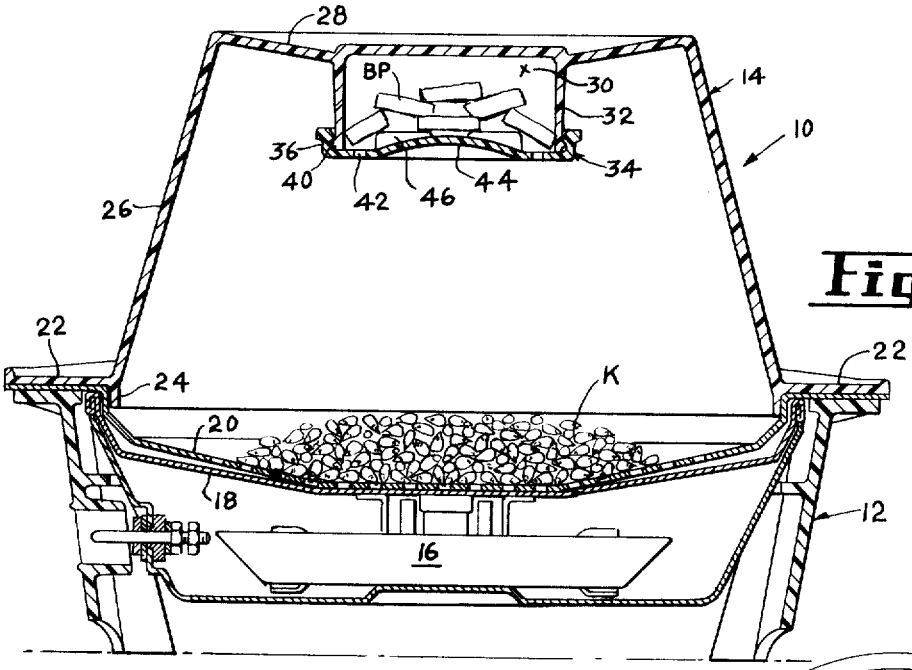
FIG. 1 is a centerline sectional view showing at the beginning of operation a popcorn popper embodying the invention and provided with a supply of unpopped corn in the popping area and solid butter pats in the cover recess.
Figure 4:
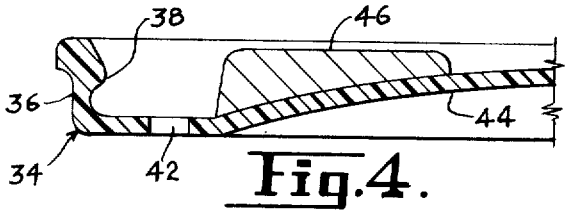
FIG. 4 is an enlarged sectional view taken on the line 4—4 of FIG. 3.

Referring more specifically to the drawings, a popper embodying the invention is designated 10 in FIG. 1. It comprises a base 12 and a cover 14. The base has a plastic frame which supports a conventional heating means 16 disposed under a popcorn popping receptacle 18 mounted in the base. *As shown in the drawings, the cover is also of plastic.*

A sifter 20 having perforations in a central zone may be provided optionally to permit unpopped kernels at the end of the pop to fall through and thus separate from the popped corn in a manner known in the art.

The cover 14 comprises diametrically opposed outward supporting handles 22 extending outward from a lip 24 which fits into the receptacle. Extending upward from the lip 24 is a frusto-conical side wall 26 and a top wall 28. A butter-receiving support comprising recess 30 is formed by an annular downwardly extending wall 32 which has a plastic cap 34 adapted to snap about its lower end. The cap provides floor means for the recess.

Figure 3:
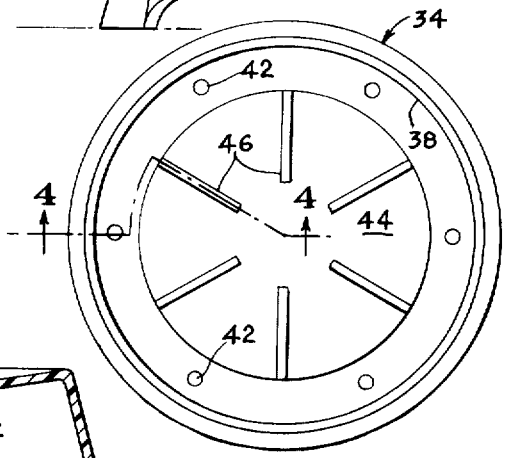
FIG. 3 is an enlarged top view of a cap comprising a floor of the butter recess.

As shown in FIG. 3, the plastic cap 34 is circular in shape with an upturned skirt 36 having an inward annular projection 38 adapted to snap over nibs 40 at the bottom of the wall 32. The cap has a plurality of apertures 42 through which melted butter may drip onto the popcorn and the cap has a central upward mound 44 which directs melted butter towards the apertures. A plurality of upward radial ribs 46 on the top of the mound 44 support the butter pats BP and permit heating air to circulate underneath and through them to facilitate melting.

Figure 2:
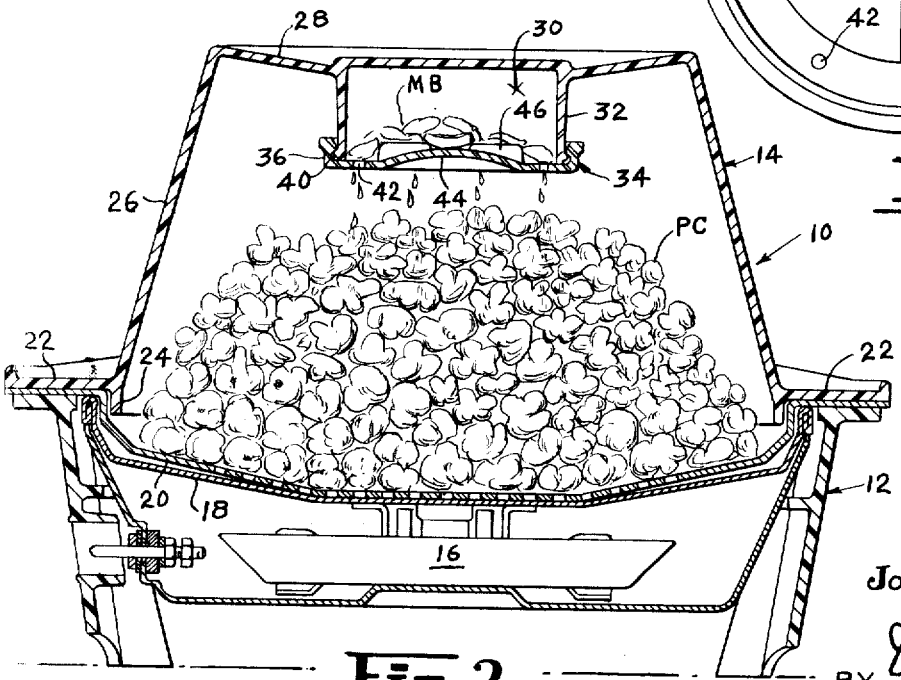
FIG. 2 is a view similar to FIG. 1 but showing the operation advanced to a point where the popping is nearly complete and the butter is being dispensed.

In operation, FIG. 1, kernels K of unpopped corn are placed in the receptacle 18 on top of the silfter 20 or directly in the receptacle 18 itself if it is desired to operate without the sifter 20. Pats of butter BP are placed in the butter-receiving recess 30 and the cap 34 is installed thereon. The heating means 16 is activated in the usual way. When the corn is virtually through popping (FIG. 2), the heat generated will raise the temperature of the butter in chamber 30 and the pats will become melting butter MB. The fluid butter flowing down the mound 44 will drip through the apertures 42 onto the popped corn. When this process is complete, the cover 14 may be removed in the conventional way and the popcorn served.

It will be understood that some control of the melting can be achieved by varying the size of the ribs 46. Because the surface of the cap is warm toward the end of the cooking cycle, the more surface contact that the butter or margarine has with the cap the sooner the melting will commence and the more rapidly it will proceed. The term "butter" herein and in the claims is meant to include margarine and other butter substitutes.

Appliances embodying my invention have proved economical to manufacture and effective in operation. Variations are possible from the embodiment shown still falling within the scope of the following claim language:

I claim:

1. An electric corn popper comprising a receptacle, a heating element in heat-exchange relation with the receptacle, and a [molded transparent] plastic cover, the cover having a centrally disposed butter compartment, said compartment being also of [transparent molded] plastic, the butter compartment being enclosed and being defined by an upper wall portion and a lower wall portion, one of the portions being fixedly carried by the cover and the other portion being removable from the one portion to provide access into the compartment, and said lower portion including a generally horizontal floor formed with a plurality of apertures *at least* about the margin of the floor, *the said other portion being a plastic cap having an annular peripheral wall which interengages with the outer surface of the said one portion to join the said other portion and the said one portion,* the apertures being adapted not to pass chunks of butter but adapted to pass melted butter to drip on the corn in the popper below when the heat in the popper melts the butter in the compartment.

2. An electric corn popper comprising a receptacle, a heating element in heat-exchange relation with the receptacle, and a [transparent molded] plastic cover, the cover having a centrally disposed butter compartment, the butter compartment being enclosed and being defined by an upper wall portion and a lower wall portion, one of the portions being fixedly carried by the cover and the other portion being removable from the one portion to provide access into the compartment, the said lower portion including a generally horizontal floor formed with a plurality of apertures about the margin of the floor, the center of the floor being substantially imperforate, *interengageable snap-on means carried by said portions for detachably holding said portions in operative relation,* and the apertures being adapted not to pass chunks of butter but adapted to pass melted butter to drip on the corn in the popper below when the heat in the proper melts the butter in the compartment.

3. An electric corn popper comprising a receptacle, a heating element in heat-exchange relation with the receptacle, and a [transparent molded] plastic cover, the cover having a centrally disposed butter compartment, the butter compartment being enclosed and being defined by an upper wall portion and a lower wall portion, one of the portions being fixedly carried by the cover and the other portion being removable from the one portion to provide access into the compartment, the said lower portion including a generally horizontal floor formed with a plurality of apertures about the margin of the floor, the center of the floor being higher than the said margin, the apertures being adapted not to pass chunks of butter but adapted to pass melted butter to drip on the corn in the popper below when the heat in the popper melts the butter in the compartment.

4. An electric corn popper as described in claim 3 wherein the floor has upstanding ribs to support such butter chunks.

References Cited

The following references, cited by the Examiner, are of record in the patented file of this patent or the original patent.

UNITED STATES PATENTS

| | | | |
|---|---|---|---|
| 2,316,989 | 4/1943 | Scott | 99—323.8 |
| 2,756,905 | 7/1956 | Wickesberg | 222—146 |
| 2,771,836 | 11/1956 | Denehie et al. | 99—323.8 X |
| 2,843,080 | 7/1958 | Woodruff | 99—323.8 X |
| 2,901,587 | 8/1959 | Burresor | 219—441 |
| 2,923,803 | 2/1960 | Kueser | 219—441 |
| 3,294,546 | 12/1966 | Fingerhut | 99—323.8 X |
| 3,611,910 | 10/1971 | Huges | 99—323.5 |
| 2,348,507 | 5/1944 | Wells | 99—347 |
| 907,370 | 12/1908 | Jones | 99—345 |
| 2,637,656 | 5/1953 | Baunach | 99—323.5 |
| 1,245,711 | 11/1917 | Happer | 99—345 |
| 1,245,710 | 11/1917 | Happer | 99—345 |
| 831,088 | 9/1906 | McCaughey | 99—345 |
| 1,380,656 | 6/1921 | Lauth | 99—345 X |
| 1,477,704 | 12/1923 | Holcomb et al. | 99—323.9 |
| 1,658,486 | 2/1928 | Howe | 99—323.8 |
| 2,017,293 | 10/1935 | Priest | 99—323.8 X |

FOREIGN PATENTS

| | | | |
|---|---|---|---|
| 568,442 | 4/1945 | Great Britain | 99—347 |
| 3,705 | 2/1902 | Great Britain | 99—345 |

BILLY J. WILHITE, Primary Examiner

U.S. Cl. X.R.

99—345; 222—146 HE